United States Patent
Scally et al.

(10) Patent No.: US 10,866,164 B2
(45) Date of Patent: Dec. 15, 2020

(54) BIODEGRADABLE STERILE SAMPLING BAG

(71) Applicant: LABPLAS INC., Sainte-Julie (CA)

(72) Inventors: May L. Scally, St. Mathias sur Richelieu (CA); Shoreh Parandoosh, Mont Saint-Hilaire (CA); Danielle Lafond, Mont Saint-Hilaire (CA)

(73) Assignee: LABPLAS INC., Sainte-Julie (CA)

( * ) Notice: Subject to any disclaimer, the term of this patent is extended or adjusted under 35 U.S.C. 154(b) by 0 days.

(21) Appl. No.: 16/658,736

(22) Filed: Oct. 21, 2019

(65) Prior Publication Data

US 2020/0158601 A1 May 21, 2020

Related U.S. Application Data

(63) Continuation of application No. 15/357,488, filed on Nov. 21, 2016, now abandoned, which is a (Continued)

(30) Foreign Application Priority Data

Sep. 28, 2009 (CA) .................................... 2680970

(51) Int. Cl.
*G01N 1/02* (2006.01)
*B29D 22/00* (2006.01)
(Continued)

(52) U.S. Cl.
CPC ............. *G01N 1/02* (2013.01); *B29D 22/003* (2013.01); *B65H 45/12* (2013.01); *C08J 5/18* (2013.01);
(Continued)

(58) Field of Classification Search
None
See application file for complete search history.

(56) References Cited

U.S. PATENT DOCUMENTS

| D192,696 S | 5/1962 | Saxe |
| 3,098,594 A | 7/1963 | Williamson |
| (Continued) | | |

OTHER PUBLICATIONS

Robert Leaversuch, "Additive Masterbatches Make Polyolefins Degrade", Plastics Technology, Oct. 2002.
(Continued)

*Primary Examiner* — Matthew D Krcha
(74) *Attorney, Agent, or Firm* — Bereskin & Parr LLP/S.E.N.C.R.L., s.r.l.

(57) ABSTRACT

A biodegradable sampling bag for containing samples or the like, comprises a flexible enclosure defining a chamber adapted to contain therein the sample, the flexible enclosure being made of a plastic material, which contains an additive that renders the flexible enclosure biodegradable when exposed for a sufficient period of time to microbial action. The additive is adapted to enable microorganisms to metabolize the molecular structure of said flexible enclosure. The additive is effective in altering the polymer chain of the plastic material to allow microbial action of a suitable environment to colonize in and around the plastic material, whereby microbes can then form a biofilm on a surface of the flexible enclosure and secrete acids which break down the entire polymer chain. The flexible enclosure, when exposed to microbial action, is adapted to withstand biodegradation for a given period of time, typically of at least three months.

14 Claims, 1 Drawing Sheet

Related U.S. Application Data continuation of application No. 14/522,229, filed on Oct. 23, 2014, now abandoned, which is a continuation of application No. 13/498,812, filed as application No. PCT/CA2010/001533 on Sep. 28, 2010, now abandoned.

(51) Int. Cl.

| | | |
|---|---|---|
| *C08K 3/012* | (2018.01) | |
| *B65H 45/12* | (2006.01) | |
| *C08L 23/06* | (2006.01) | |
| *C08J 5/18* | (2006.01) | |
| *C08K 5/00* | (2006.01) | |
| *B29K 23/00* | (2006.01) | |

(52) U.S. Cl.
CPC .......... *C08K 3/012* (2018.01); *C08K 5/0033* (2013.01); *C08L 23/06* (2013.01); *B29K 2023/0633* (2013.01); *B29K 2995/006* (2013.01); *C08J 2323/06* (2013.01); *C08K 2201/018* (2013.01); *Y10T 428/1345* (2015.01)

(56) References Cited

U.S. PATENT DOCUMENTS

| | | | |
|---|---|---|---|
| 3,229,876 A | | 1/1966 | Osborn, Jr. |
| 3,237,826 A | | 3/1966 | Ringholz et al. |
| 3,477,624 A | | 11/1969 | Branyon et al. |
| 3,698,548 A | | 10/1972 | Stenzel et al. |
| 3,782,650 A | | 1/1974 | Donnell, Jr. |
| 3,826,361 A | | 7/1974 | Heckrodt |
| 3,979,019 A | | 9/1976 | Bliss |
| 3,979,050 A | | 9/1976 | Cilia |
| 4,341,410 A | | 7/1982 | Summach |
| 4,453,649 A | | 6/1984 | Origuchi |
| 4,645,108 A | | 2/1987 | Gavin et al. |
| 4,714,643 A | | 12/1987 | Kuenzel |
| 4,805,800 A | | 2/1989 | Nocek et al. |
| 4,850,486 A | | 7/1989 | Neibaur |
| 4,904,092 A | | 2/1990 | Campbell et al. |
| 5,046,619 A | | 9/1991 | Hwang |
| 5,167,377 A | | 12/1992 | Chalmers |
| 5,170,957 A | | 12/1992 | Carpenter |
| 5,183,157 A | | 2/1993 | Darden |
| 5,219,424 A | | 6/1993 | Simhaee |
| 5,228,632 A | | 7/1993 | Addison et al. |
| 5,509,570 A | | 4/1996 | DeMatteis |
| 5,564,829 A | * | 10/1996 | Lafond ................ B01F 9/0014 366/348 |
| 5,590,784 A | | 1/1997 | Daniels |
| 5,752,666 A | | 5/1998 | Simhaee |
| 6,079,563 A | | 6/2000 | Katchmazenski |
| 6,135,281 A | | 10/2000 | Simhaee |
| 6,283,405 B1 | | 9/2001 | Tracy |
| 6,439,502 B1 | | 8/2002 | Gemmell et al. |
| D467,454 S | | 12/2002 | Le et al. |
| 6,488,222 B1 | | 12/2002 | West et al. |
| D472,413 S | | 4/2003 | Haas |
| 6,564,829 B2 | | 5/2003 | Arisato |
| 6,575,301 B2 | | 6/2003 | Simhaee |
| 6,635,002 B1 | | 10/2003 | Yeh |
| D504,812 S | | 5/2005 | Keberlein et al. |
| 6,945,695 B2 | | 9/2005 | Rabiea |
| 6,976,563 B1 | | 12/2005 | Shaw |
| 7,252,194 B2 | | 8/2007 | Tracy |
| D590,126 S | | 4/2009 | Kovich et al. |
| 7,984,844 B2 | | 7/2011 | Jones |
| 8,104,657 B2 | | 1/2012 | Barella |
| D683,245 S | | 5/2013 | Palmer et al. |
| 8,960,494 B1 | | 2/2015 | Gluck |
| D735,488 S | | 8/2015 | Page et al. |
| D785,362 S | | 5/2017 | Trunsky |
| D787,321 S | | 5/2017 | Pantelleria |
| 2003/0136793 A1 | | 7/2003 | Chen |
| 2005/0194415 A1 | | 9/2005 | Danechi |
| 2005/0274638 A1 | | 12/2005 | Smith |
| 2006/0151660 A1 | | 7/2006 | Stringer |
| 2006/0163419 A1 | | 7/2006 | Horn |
| 2006/0169829 A1 | | 8/2006 | Slocum et al. |
| 2008/0103232 A1 | * | 5/2008 | Lake .................. C08K 5/09 523/124 |
| 2008/0187254 A1 | | 8/2008 | Hall |
| 2008/0272016 A1 | | 11/2008 | Anderson et al. |
| 2009/0127276 A1 | | 5/2009 | Rippl et al. |
| 2010/0258580 A1 | | 10/2010 | Decker et al. |
| 2014/0263532 A1 | | 9/2014 | Licata |
| 2015/0196174 A1 | | 7/2015 | Goltz et al. |
| 2015/0250364 A1 | | 9/2015 | Yamada |
| 2016/0107790 A1 | | 4/2016 | Maddox, Jr. |

OTHER PUBLICATIONS

Robert Sinclair, "Additive Technology for Polyolefin Biodegradation" presented at 2004 PLACE conference, TAPPU, URL:http://www.tappi.org/content/enewsletters/eplace/2004/02-2Sinclair.pdf. (The year of publication is sufficiently earlier than the effective U.S. filing date so that the particular month of publication is not an issue.).

ECM BioFilms, Inc., "ECM MasterBatch Pellets ECM6.0701", Material Safety Data Sheet, Validation Date: Jul. 10, 2007.

* cited by examiner

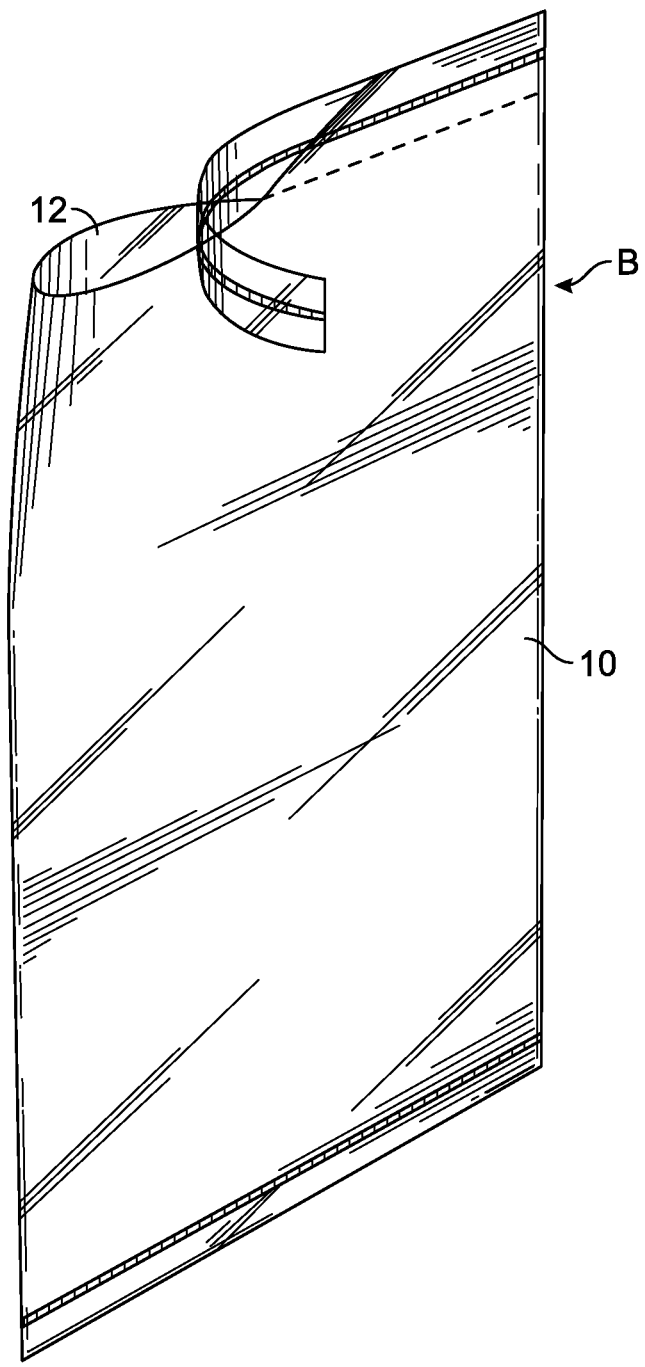

BIODEGRADABLE STERILE SAMPLING BAG

CROSS REFERENCE TO RELATED APPLICATIONS

The present application is a continuation application of U.S. Ser. No. 15/357,488 filed on Nov. 21, 2016, that is a continuation application of U.S. Ser. No. 14/522,229 filed on Oct. 23, 2014, that is a continuation application of U.S. Ser. No. 13/498,812 filed on Sep. 11, 2012, that is a 371 national stage entry of international application PCT/CA2010/001533 filed on Sep. 28, 2010, that claims priority to Canadian Patent Application No. 2,680,970 filed on Sep. 28, 2009. These documents are all hereby incorporated by reference in their entirety.

FIELD OF THE INVENTION

The present invention relates to bags and, more particularly, to sterile sampling bags for use in handling sample materials and the like (such as clinical samples), for instance in laboratories, in hospitals, in the food industry, etc.

BACKGROUND OF THE INVENTION

Sterile sampling bags are used to collect, contain and carry a variety of sample materials that are pertinent to the agro-food, pharmaceutical, medical and environmental industries. These industries are all subject to various regulatory bodies, such as the FDA in the United States of America, Health Canada, HCAPP, etc. These regulators ensure that all products intended for consumption or interaction with the general public (either directly, such as food products, or indirectly, such as chemical fertilizers), meet scientific and measured standards that confirm their safety.

In order for a sampling bag to be viable for these industries, the following specifications should be met:
  made from virgin materials;
  does not, in any way, interfere with the integrity of the substance being tested;
  does not leach any altering chemicals, such as cadmium, mercury, lead, etc., into the substance it is carrying;
  sterile (therefore harbors no fungus, mold, aerobic or anaerobic bacteria);
  the producer provides a sterility certificate and ensure production lot number traceability for the entire shelf life of the sampling bag;
  when used for DNA detection, must be R-Nase, D-Nase and pyrogen free;
  physically viable: not porous, able to contain a specific range of PH and acidity levels;
  typical shelf life of 3 years minimum, under ambient storage conditions, before use; and
  sufficiently elastic and of low tear propensity to accommodate the pressures of a laboratory homogenizer.

In order to better understand these requirements, the following is a typical description of a field application for the use of a sampling bag.

At varying and predetermined intervals during any given food production process, samples of the food matter will be collected using sanitary methods and by inserting the substance in a sterile sampling bag. This occurs at many stages of the process, from the raw material phase, throughout the process and again with the final product. Furthermore, work surfaces, production and handling machinery and packaging materials are also sampled for testing. Essentially, these components are all being tested to ensure that no harmful pathogens (such as *E. coli, Listeria, Salmonella*) or chemicals are present. Typically, various nutritive solutions are added to the sample substance and it is then transported to a laboratory for incubation and subsequent microbial analysis. The sampled material can be retained in a sampling bag for a wide variety of time periods. Usually, this consists of a few days, however, in some cases the sample can be retained for months, such as in a freezer environment.

Such sampling bags are typically made of plastics material and thus constitute a significant concern, when discarded, for the environment.

Therefore, there is a need for a sampling bag that is friendlier to the environment.

SUMMARY OF THE INVENTION

It is therefore an aim of the present invention to provide a biodegradable sampling bag that will respect a sufficient number of the aforementioned criteria, depending on the intended use of the bag.

Therefore, in accordance with the present invention, there is provided a biodegradable sampling bag for containing samples or the like, comprising a flexible enclosure defining a chamber adapted to contain therein the sample, said flexible enclosure being made of a plastic material, said plastic material containing an additive that renders said flexible enclosure biodegradable when exposed for a sufficient period of time to microbial action.

Also in accordance with the present invention, there is provided a method of making a biodegradable sampling bag, comprising the steps of: a) producing a flexible enclosure from a plastic material containing an additive that renders said flexible enclosure biodegradable when exposed for a sufficient period of time to microbial action; and b) making a bag from said flexible enclosure, said bag defining a chamber adapted to contain therein a sample.

Further in accordance with the present invention, there is provided for the use of a plastic material containing an additive for making a biodegradable sampling bag, wherein the plastic material containing said additive is adapted to enable microorganisms to metabolize the molecular structure of said sampling bag and cause said sampling bag to biodegrade, but being adapted, when exposed to microbial action, to sustain biodegradation for a given period of time.

Other objects, advantages and features of the present invention will become more apparent upon reading of the following non-restrictive description of embodiments thereof, given by way of example only.

BRIEF DESCRIPTION OF THE DRAWINGS

The drawings included herewith are for illustrating various examples of articles, methods, and apparatuses of the present specification. In the drawings:

FIG. 1 is a schematic representation of a sampling bag.

DESCRIPTION OF ILLUSTRATIVE EMBODIMENTS OF THE INVENTION

The sampling bag of the present invention, such as the sampling bag B shown in FIG. 1, is produced with virgin Low-Density Polyethylene Low-Density Polyethylene (LDPE) tubing which includes a specially formulated technology that incorporates nutrients and other compounds which alter the polymer chain to allow microbial action to colonize in and around the plastic. Microbes can then form a biofilm on the surface of the plastic and secrete acids which break down the entire polymer chain, converting the material into inert humus (biomass), $CO_2$, methane and water. The sampling bag B includes a flexible enclosure 10 defining a chamber 12 adapted to contain therein a sample.

The present sampling bag has a similar five year shelf life as conventional bags. The biodegradation of the plastic is not triggered by heat, light, or moisture. Furthermore, the sampling bag was submitted to 20 weeks of intense exposure to laboratory conditions (inoculation with various fungi, moisture, bacteria) and remained physically and chemically intact. The sampling bag is sterile and is also R-Nase, D-Nase and pyrogen free.

The additive technology does not activate until the sampling bag is disposed of in a compost or sewage environment. Biodegradation under these conditions occurs over a period of, for instance, nine months to five years, depending on the concentration of microorganisms in the disposal environment.

Biodegradable Plastic Technology and the Sampling Bag Challenge

Plastic materials and polymers are rendered biodegradable through the addition of substances that impact their molecular structures. The goal is to sufficiently weaken or interrupt their polymer chains in order to allow environmental factors to interact with them for eventual degradation. Unadulterated polymer chains do not otherwise lose their molecular structure, and therefore are believed to remain intact within our ecological systems (landfills, sewage, general environment) for indefinite periods.

The very concept of attempting to produce/develop a biodegradable sampling bag is counterintuitive to the requirements of the scientific community and stability that the bag must possess (see list of aforementioned specifications).

Beyond the characteristics required of a sampling bag, during the course of its useful life, the bag will be subjected to a wide variety of materials, liquids and ambient conditions. These sampling bags are used by the scientific community, a group that is extremely knowledgeable and, understandably, not prone to modifications of proven tools and methodology. Analytical results, scientific validations and public security are reliant on the integrity of the entire testing process, including the sterile sampling container.

The Technological Challenges

Most current biodegrading catalyst agents known today are cellulose-based and many are heat and/or light activated. One known agent enables bacterial interaction. This summary will examine all three as to their potential application for the production of biodegradable sampling bags.

1) Cellulose is a plant-derived base, therefore of organic origin. This technology causes two factors that make it inappropriate for consideration when searching for a method to produce biodegradable sampling bags:
  the plastic material becomes rigid in structure, with no elasticity and tears too easily; and
  there is significant risk of traces of organic material in the plastic, which would significantly interfere with the substances being sampled and tested in the food, chemical, medical and pharmaceutical industry.

2) Heat and Light activated additives present a particular challenge and are also inappropriate:
  plastics are produced through melting of granule mixtures and consequent extrusion. Any biodegradable plastics produced with this type of heat-activated additive begin to degrade as soon as they are produced. The resulting material is indeed biodegradable; however, it is unstable and has a very short shelf life; and
  furthermore, under normal shelf storage conditions, the plastic will be exposed to light, which will further hasten its degradation.

3) Bacteria Enabling Catalyst:

In the present invention, Applicant has identified a biodegradable additive produced by Biofilms, commercialized under the name MasterBatch Pellets™, which enables microorganisms in the environment to metabolize the molecular structure of plastic products. The plastic degrades through the action of aerobic and anaerobic bacteria, and is not rendered unstable by light or heat. The plastic, in this case Linear Low-Density Polyethylene (LLDPE) remains stable, pliable and sufficiently transparent for the sampling bag application.

However, this additive also bears a potential challenge and is very counterintuitive to being viable for the microbiological analyses industry, in that sampling bags are used to enhance and encourage the growth of bacteria and other microorganisms, in order to detect their presence; and if the plastic material of the bag begins to degrade when in contact with such active bacteria, how can a sampling bag provided with the aforementioned biodegradable additive be considered as even remotely viable for this application?

The Solution

The ECM Biofilms biodegrading additive is the more promising of these types of additives on the market; however, two inherent questions had to be answered in order for the product technology to be applicable for a sampling bag application:
  does the sampling bag retain the minimum levels of physical and chemical characteristics required in order to be viable?
  how long will the biodegradable sampling bag remain intact once it is in contact with bacteria, Fungi, mold or other microorganisms?

Proofing Methodology and Outcomes

Applicant obtained biodegradable LLDPE tubing produced with the ECM Biofilms additive.

Physical Validation:

Applicant's production team applied this raw material to its conventional production process with the following results:
  the material performed well when running through Applicant's bag making technology;
  print ink adheres very well to the surface and is retained thereon for a sufficient period;
  Applicant's tape and wire closure system adheres well to the surface of the biodegradable LLDPE; and
  the resulting sterile bag is still sufficiently transparent and has the appropriate and, to the naked eye, has the required physical appearance.

Scientific Validation of the Physical Attributes

Base Testing:

First, Applicant's standard, FDA approved, non-biodegradable LLDPE film was subjected to a series of physical and chemical tests to confirm various measurements as a control test against which to measure and control the same attributes for the new biodegradable film of the present invention.

Next, the biodegradable LLDPE film was subjected to the same physical, chemical and biological testing, in order to obtain its baseline physical measurements.

Base Test Results of the biodegradable film:

has met the United States of Pharmacopeia (USP) 29, National Formulary (NF) 24 criteria for physical testing;

is R-Nase, D-Nase and pyrogen free, per test results from the outside laboratory, Mobio;

has an MVTR (Moisture Vapor Transmission Rate) value of 0.38 g/100 in$^2$/day, which is comparable to Applicant's standard (non-biodegradable) material which has an MVTR value of 0.32 g/100 in$^2$/day; and has an OTR (Oxygen Transmission Rate) value of 381 cc/100 in$^2$/day which is comparable to Applicant's standard material which has OTR results of 480 cc/100 in$^2$/day.

Testing of Product Viability and Integrity (under market conditions and applications):

The additive used to render the LLDPE film biodegradable, enables microorganisms to digest and break down plastic molecular structures. Applicant's sterile sampling bags are used to gather food, water, and other substances, and to actually incubate them in order to allow any present microorganisms to multiply and form colonies. Samples and related substances can remain in the bag from periods of a few hours to a few months.

ECM Biofilms states that products manufactured with their biodegrading catalyst remain stable and have similar shelf lives to their non-biodegradable counterparts. They also claim that the treated material will biodegrade in nine months to five years (depending on the plastic polymer, its thickness, and the composting, sewage, or disposal environment conditions where microorganisms are present). Applicant needed to ensure that the sampling bags would retain their physical integrity for the useful life thereof, i.e. from the moment a sample is inserted inside, to the time of disposal, which is usually less than three days but which could, however, range up to a few months.

Product (sampling bags) samples of the present invention were submitted to three consecutive months of exposure to microorganisms, molds and fungi, and, once a month, some pieces were submitted to physical testing in order to measure tensile strength, MVTR (Moisture Vapor Transmission Rate) and OTR (Oxygen Transmission Rate). All testing was performed by outside firms.

The results of the physical tests at the end of each month have confirmed that the biodegradable plastic material of the present invention remains physically unchanged when exposed to laboratory-like applications and microorganisms for a minimum period of three months.

In light of these confirmed results, Applicant considers that the present biodegradable Low Density Polyethylene has been scientifically validated, that it meets market and scientific requirements, and that it can be used for at least three months without any degradation.

Although the present invention has been described hereinabove by way of embodiments thereof, it may be modified, without departing from the nature and teachings of the subject invention as described herein.

The invention claimed is:

1. A biodegradable sampling bag for containing a sample containing microbes, the biodegradable sampling bag consisting of:
a flexible enclosure defining a chamber adapted to contain therein the sample containing microbes, said flexible enclosure being made of a plastic material, said plastic material containing an additive that renders said flexible enclosure biodegradable when exposed for a sufficient period of time to microbial action, said plastic material encouraging growth of the microbes in the sample when the sample is contained in the flexible enclosure, and said plastic material configured to provide the flexible enclosure to withstand biodegradation for a period of 20 weeks when exposed to the microbial action from the microbes in the sample and to biodegrade in nine months to five years when exposed to microbial action of a disposal environment.

2. A biodegradable sampling bag as defined in claim 1, wherein said additive enables microorganisms to metabolize the molecular structure of said flexible enclosure.

3. A biodegradable sampling bag as defined in claim 2, wherein said additive has altered the polymer chain of said plastic material to allow microbial action of a suitable environment to colonize in and around said plastic material, whereby microbes can then form a biofilm on a surface of said flexible enclosure and secrete acids which break down the entire polymer chain.

4. A biodegradable sampling bag as defined in claim 3, wherein the microbial action eventually converts said flexible enclosure into carbon dioxide and water when subjected to aerobic biodegradation, and into carbon dioxide, methane and water when subjected to anaerobic biodegradation.

5. A biodegradable sampling bag as defined in claim 4, wherein said flexible enclosure, when exposed to microbial action, remains transparent for the period of time.

6. A biodegradable sampling bag as defined in claim 5, wherein said bag is sterile.

7. A biodegradable sampling bag as defined in claim 6, wherein said plastic material is Low-Density Polyethylene (LDPE) sheet material.

8. A biodegradable sampling bag as defined in claim 6, wherein said plastic material is Linear Low-Density Polyethylene (LLDPE) sheet material.

9. A biodegradable sampling bag as defined in claim 8, wherein said plastic material comes in the form of tubing for manufacturing said flexible enclosure.

10. A biodegradable sampling bag as in claim 9, wherein said additive comprises ethylene-vinyl acetate copolymer with additive ingredients being organoleptic-organic compounds, cultured colloids and natural fiber.

11. A biodegradable sampling bag as defined in claim 10, wherein said flexible enclosure is sealed except at one portion thereof which comprises bag access means for substantially sealing said bag in a first position thereof but also selectively allow in a second position thereof the sample to be introduced in said chamber when it is desired to use said bag, whereby once in said second position the sample can be received in said bag.

12. A biodegradable sampling bag as defined in claim 11, wherein said access means comprises a detachable tear off strip.

13. A biodegradable sampling bag as defined in claim 12, wherein said strip includes sealing means for sealing said bag in said first position but be removed from said bag with said detachable strip in said second position thereby opening said bag at said one portion thereof for subsequent receipt of the sample therein.

14. The use of a plastic material containing an additive for making a biodegradable sampling bag, wherein the plastic material containing said additive is configured to provide for microorganisms to metabolize the molecular structure of said sampling bag and cause said sampling bag to biodegrade in a period of nine months to five years and to provide for the sampling bag to withstand biodegradation for a period of 20 weeks when the sampling bag is exposed to microbial action of a sample contained within the sampling bag, the plastic material encouraging growth of microbes in the sample when the sample is contained in the sampling bag;

wherein the use comprises making the biodegradable sampling bag using said plastic material.

\* \* \* \* \*